Nov. 14, 1961 C. E. BAIRD 3,008,452
ANIMAL INSECTICIDE APPLICATOR
Filed Aug. 4, 1959
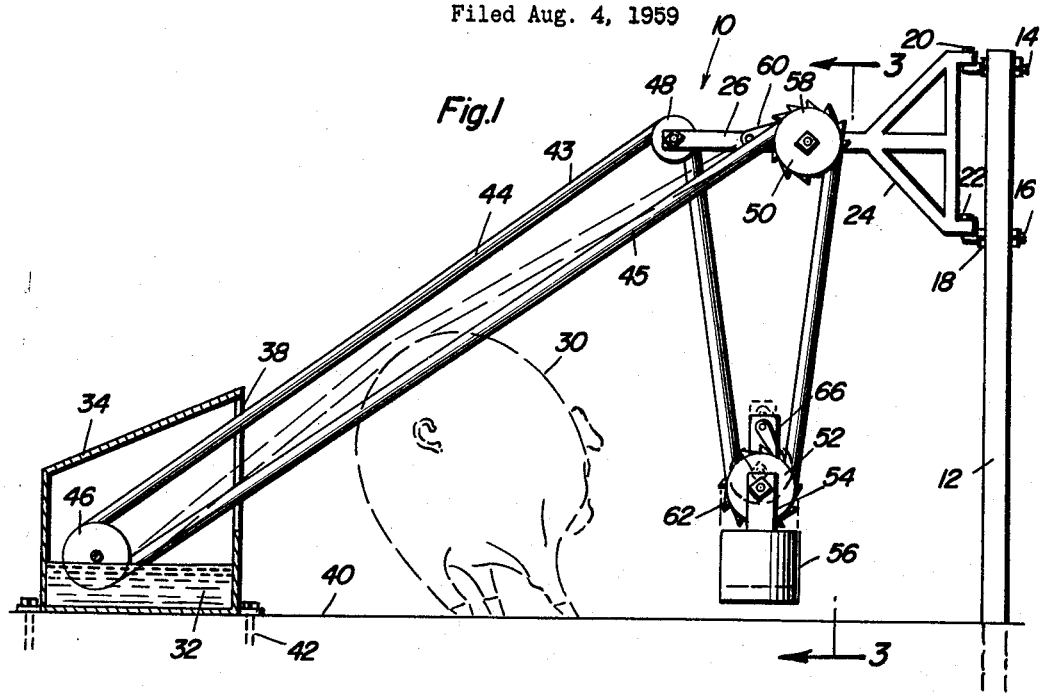
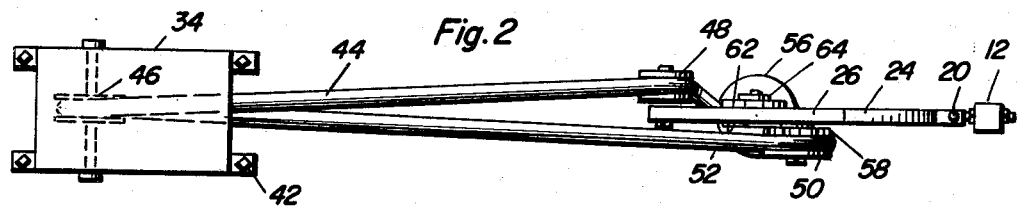
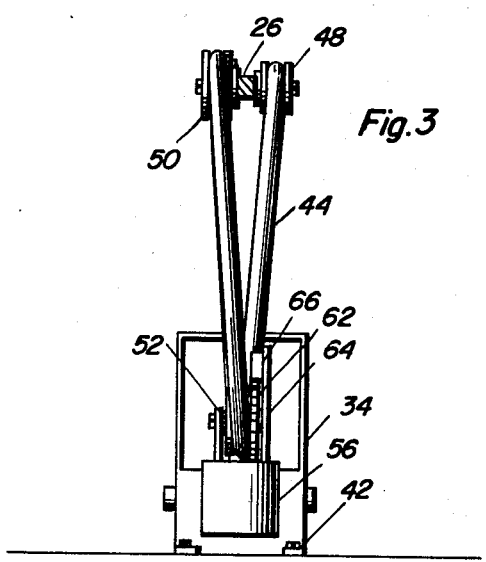
Charles E. Baird
INVENTOR.

3,008,452
ANIMAL INSECTICIDE APPLICATOR
Charles E. Baird, R.R. 2, Edna, Kans.
Filed Aug. 4, 1959, Ser. No. 831,516
4 Claims. (Cl. 119—157)

This invention relates generally to apparatus for applying insecticide to animals and more particularly to a device which serves the dual function of an animal scratcher and insecticide applicator.

It will be appreciated that animals often like to rub or scratch portions of their bodies. Accordingly, the prior art discloses various devices which enables an animal to easily rub its back against a slightly abrasive surface. It has been found desirable to apply insecticide to animals at periodic intervals. Generally, the application of the insecticide is accomplished manually and therefore is tedious and time consuming. Since it is appreciated that the animals will voluntarily rub or scratch portions of their bodies, apparatus for applying insecticide to the animal by means of the surface against which the animal is rubbing would prove to be advantageous inasmuch as time and labor would be saved.

Accordingly, it is the principal object of this invention to provide an animal insecticide applicator which automatically serves to apply insecticide to an animal when the animal engages an abrasive surface to rub or scratch its body.

It is a more particular object of this invention to provide a novel animal insecticide applicator which includes an abrasive belt which passes through a quantity of insecticide carried in a tank. The abrasive belt is endless and loosely extends around a plurality of pulleys. A weighted pulley is freely threaded on the belt for tensioning the belt around the plurality of pulleys and pawl and ratchet means are associated with at least one of the pulleys for allowing rotative movement thereof in only one direction. Accordingly, when an animal leans against a portion of the belt, the belt will be rotated about the pulleys and through the insecticide whereby insecticide will be picked up by the belt and be applied to the animal.

A still further object of this invention is to provide a novel animal insecticide applicator which though being automatic in operation is simple in construction and accordingly inexpensive to manufacture and utilize.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is an elevational rear view of the animal insecticide applicator apparatus;

FIGURE 2 is an elevational plan view of the apparatus; and

FIGURE 3 is a vertical sectional view taken substantially along the plane 3—3 of FIGURE 1.

With continuing reference to the drawing, the numeral 10 generally represents the apparatus for applying insecticide to animals and for allowing them to rub their bodies thereagainst.

Initially, a vertical standard 12 is provided and passes therethrough supports 14 and 16 which are secured to the standard 12 by bolts 18. Each of the supports 14 and 16 includes an offset portion 20 and 22 respectively. An A frame 24 has apertured depending legs which are pivoted on the vertical axis defined by the offset portions 20 and 22. Forming a portion of the A frame 24 is a central supporting member 26 which extends perpendicularly to the standard 12.

An animal, such as a pig 30 desires to rub or scratch his body and also, it is desired to apply insecticide thereto. The insecticide 32 is in liquid form and received in a tank 34 which is open as at 38. The tank 34 is preferably fastened to the ground 40 by bolts 42.

A round belt 44 which is absorbent and has a slightly abrasive surface is utilized for applying insecticide to the animal 30 and for rubbing his body. The belt 44 is endless and loosely extends around a first pully 46 rotatably mounted in the tank 34. It will be appreciated, upon viewing FIGURE 1, that the belt 44 becomes saturated with insecticide applied thereto as it extends around the pulley 46, passing through the insecticide 32. The endless belt 44 further extends around a second rotatable pulley 48 terminally and rotatably carried by the bracket 26. A third pulley 50 is also rotatably secured to the bracket 26. It will be seen that the endless belt 44 is loosely received around the pulleys 46, 48 and 50.

A fourth pulley 52 is rotatably received between a pair of upwardly extending bosses 54 which are in turn secured to a weight 56. The endless belt 44 is threaded between the pulley 52 and the weight 56 as illustrated particularly in FIGURES 1 and 3. It will be noted that the weighted pulley 52 tensions the endless belt 44 around the pulleys 46, 48 and 50 so that the belt 44 is normally disposed in its full line position illustrated in FIGURE 1. When the animal 30 engages the belt 44 to urge it to its dotted line position illustrated in FIGURE 1, the belt 44 will tend to rotate each of the pulleys.

For the purpose of constantly applying insecticide onto the belt 44 and hence onto the animal 30, it is desirable that the belt 44 rotate in one direction only about the pulley 46 and through the insecticide 32. In order to do this, circumferential ratchet means 58 are provided on the pulley 50 and a pawl 60 is pivotally secured to the bracket 26 for engaging the teeth of the ratchet 58. It will be appreciated that, viewing the apparatus as illustrated in FIGURE 1, that the pulley 50 will be prevented from rotating in a counterclockwise direction and rotation thereof will be limited to a clockwise movement. Also, the pulley 52 is provided with ratchet means 62 and an upstanding member 64 pivotally supports a pawl 66 for engagement with the ratchet means 62 circumferentially positioned on the pulley 52. It will here be appreciated that the pulley 52 may only rotate in a clockwise direction inasmuch as rotation in a counterclockwise direction is prevented by the engagement of the pawl 66 with the ratchet 62.

It is thought that the particular structural features of the apparatus should now be apparent. The automatic operation of the apparatus will now be set forth. Normally, the apparatus is disposed in its full line position indicated in FIGURE 1 wherein the portions of the endless belt 44 between the respective pulleys extend along a straight line. When the animal 30 leans against the endless belt 44 in order to rub his body, the belt 44, between the pulleys 46 and 50 will be bowed so that it no longer extends along a straight line between the pulleys 46 and 50. It will be appreciated that by bowing the belt 44 to the dotted line position, the weighted pulley 52, the only freely suspended pulley in the system, will be raised to its dotted line position illustrated in FIGURE 1. Since the endless belt 44 is round and frictionally received within each of the pulleys, all of the pulleys will tend to rotate as the belt moves thereby. Inasmuch as the pulleys 50 and 52 may rotate in clockwise direction only, the belt 44 will be pulled from pulley 48, to pulley 46, to pulley 50 and through weighted pulley 52. Therefore, it will be seen that the belt 44 will pass through the insecticide 32 and pick up insecticide. The insecticide will then be deposited or applied to the animal 30. It is thought that it will consequently be appreciated that each time an animal 30 leans against the belt 44 as illustrated in FIGURE 1, the belt will be moved through the insecticide 32 so that a fresh portion of the belt 44 will pick up insecticide 32 each time the animal leans against the belt.

From the foregoing, it will be appreciated that the apparatus is completely automatic. It will further be appreciated that the upper and lower belt portions generally indicated at 43 and 45 in FIGURE 1 provide, so to speak, a choice of rubbing elements. The apparatus allows the animal to rub and apply insecticide to most any portion of the body and there does not appear to be any waste of the insecticide solution 32.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An animal insecticide applicator comprising an endless belt, a tank including a quantity of insecticide therein, said endless belt extending into said insecticide quantity, a plurality of pulleys mounted for rotation only, said belt loosely extending around said pulleys and including an exposed lateral belt portion between a pair of pulleys, and a weighted pulley freely threaded on said belt for tensioning said belt around said plurality of pulleys.

2. An animal insecticide applicator comprising an endless belt, a tank including a quantity of insecticide therein, said endless belt extending into said insecticide quantity, a plurality of pulleys mounted for rotation only, said belt loosely extending around said pulleys and including an exposed lateral belt portion between a pair of pulleys, and a weighted pulley freely threaded on said belt for tensioning said belt around said plurality of pulleys, means associated with at least one of said pulleys for preventing rotation thereof in one direction.

3. An animal insecticide applicator comprising an endless belt, a tank including a quantity of insecticide therein, said endless belt extending into said insecticide quantity, and means for moving said belt through said insecticide when a portion of said belt is contacted by an animal, said means including a plurality of pulleys mounted for rotation only, said belt loosely extending around said pulleys and including an exposed lateral belt portion between a pair of pulleys, a weighted pulley freely threaded on said belt for tensioning said belt around said plurality of pulleys and pawl and ratchet means associated with at least one of said pulleys for preventing rotation thereof in one direction.

4. An animal insecticide applicator comprising an endless belt, a tank including a quantity of insecticide therein, said endless belt extending into said insecticide quantity, and means for moving said belt through said insecticide when a portion of said belt is contacted by an animal, said means including a plurality of pulleys mounted for rotation only, said belt loosely extending around said pulleys and including an exposed lateral belt portion between a pair of pulleys, a weighted pulley freely threaded on said belt for tensioning said belt around said plurality of pulleys and pawl and ratchet means associated with at least one of said pulleys for preventing rotation thereof in one direction, said belt having a circular cross-section.

References Cited in the file of this patent

UNITED STATES PATENTS

| 113,113 | Thorne | Mar. 28, 1871 |
| 1,221,675 | Carson | Apr. 3, 1917 |